June 7, 1966 P. A. SPORING 3,255,388
ELECTROLYTIC CAPACITOR WITH RESERVOIR OF CATHODE-METAL
IONS READILY AVAILABLE IN THE ELECTROLYTE
Filed April 26, 1961
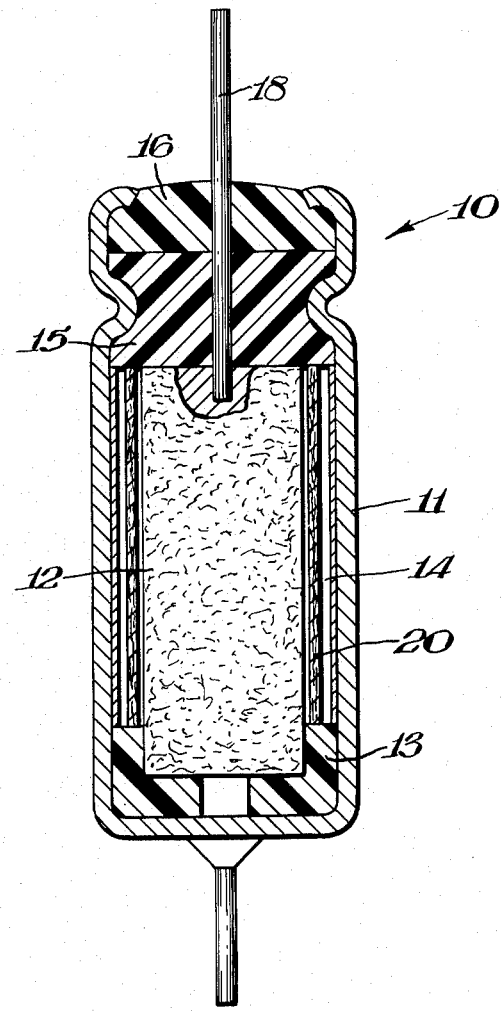
INVENTOR
*Percy Archibald Sporing*
BY *Connolly and Hutz*
ATTORNEYS 3,255,388
ELECTROLYTIC CAPACITOR WITH RESERVOIR OF CATHODE-METAL IONS READILY AVAILABLE IN THE ELECTROLYTE
Percy Archibald Sporing, Walton-on-Thames, England, assignor to Sprague Electric Company, North Adams, Mass., a corporation of Massachusetts
Filed Apr. 26, 1961, Ser. No. 105,539
Claims priority, application Great Britain, May 26, 1960, 18,641/60
2 Claims. (Cl. 317—230)

This invention relates to an electrolytic capacitor and a method of making the same, and more particularly to an improved wet tantalum capacitor and method.

The term "wet tantalum capacitor" is used in this application to identify a popular electrolytic capacitor having a porous pellet-type anode of tantalum, a dielectric of tantalum oxide on the anode, a liquid electrolyte of lithium chloride, and a cathode container of silver. The prior art wet tantalum capacitor suffers the disadvantage of reduced overall capacitance arising from the generation and deposition on the cathode of hydrogen gas. Among the reasons why gassing is a serious disadvantage in wet tantalum capacitors is that the porous anode of sintered tantalum particles provides a much greater active surface than the surface of the cathode. An attempt has been made to remedy the gassing disadvantage of these capacitors by supplying metal ions that will plate out on the cathode in preference to hydrogen. Another attempted remedy has been to coat the surface of the cathode with a material that provides a greatly increased cathode surface area. However, some of the attempted remedies of the gassing problem have been less than satisfactory and others have had only a relatively short-time effectiveness.

It is an object of this invention to overcome the disadvantages of the prior art.

It is another object of this invention to provide a long-time remedy to the gassing problem in wet tantalum capacitors.

These and other objects of this invention will become apparent upon consideration of the following description and the appended claims taken together with the drawing in which:

The single figure is a axial cross-section of a wet tantalum capacitor constructed in accordance with this invention.

The objects of this invention are attained by providing a wet tantalum capacitor having a porous pellet type tantalum anode, a dielectric of tantalum oxide covering all exposed surfaces of the anode, a cathode having at least the electrolyte contacting surface of silver, and an electrolyte solution in contact between the oxide coated anode and the cathode. The electrolyte solution according to this invention is a solution of lithium chloride and silver chloride. The silver chloride is present in excess of the amount required to provide a saturated solution. A reservoir of silver chloride is present which can be taken up into the electrolyte solution to replace the silver that is lost from the solution by plating out on the cathode in preference to hydrogen gas during operation of the capacitor. The reservoir is necessary because the amount of silver chloride that can be held in solution in lithium chloride electrolyte is so small that all the silver is lost from the saturated electrolyte in a short time.

The preferred means for adding the desired reservoir of silver chloride is to add an excess of silver nitrate to a conventional 25% lithium chloride electrolyte. Silver nitrate is added to the lithium chloride solution until a sufficient precipitation of silver chloride is obtained. It has been found that 2 cc. of one-tenth normal silver nitrate is required to cause precipitation in a 25% lithium chloride solution at room temperature; at 100° C., 13.5 cc. of silver nitrate is needed. These figures correspond to solubilities of about 1/10% and 6/10% respectively. The exact amount of silver nitrate added to the lithium chloride is not critical because the size of the reservoir of silver chloride is more dependent on space limitations within the capacitor than upon chemical reaction time.

It has been found to be disadvantageous to have a layer of precipitate at the bottom of the capacitor container which serves as the cathode of the capacitor. In the process of dissolving silver chloride from such a reservoir a homogeneous solution of silver chloride and lithium chloride may not be produced throughout the entire electrolyte.

The preferred embodiment of this invention comprises the introduction of a separator of paper or other absorbent material between the anode and the cathode. The paper is initially soaked in a solution of silver nitrate and allowed to dry. When in contact with the lithium chloride electrolyte in a capacitor, a chemical reaction takes place to substantially fill the pores of the spacer with silver chloride. This spacer which is loaded with silver chloride is ready for solution throughout the entire electrolyte upon the demand exerted by the electrochemical reaction of silver being plated out of the electrolyte during operation of the capacitor.

The preferred embodiment of this invention is shown in the drawing wherein capacitor 10 includes a silver cathode can 11 containing oxide-coated porous tantalum anode pellet 12 immersed in electrolyte 14 of lithium chloride and silver chloride. Anode pellet 12 is seated on insulating spacer 13, preferably of plastic material inert to the electrolyte 14. Anode 12 is provided with a lead-wire 18 which extends from can 11 through insulating closure members 15 and 16, at least one of which is elastomeric so as to ensure sealing of can 11. Inserted between anode 12 and cathode 11 is porous absorbent paper spacer 20 which has been soaked initially in a solution of silver nitrate and allowed to dry.

Another method of providing a reservoir of silver chloride that is available for distribution throughout the entire electrolyte is to coat the surface of the cathode wtih silver chloride. A preferred method of coating the silver cathode with silver chloride is to contact the silver cathode with a saturated aqueous solution of palladium chloride at room temperature for about 15 minutes. It has been found that the coating which adheres to the silver cathode is a mixure of metallic palladium and silver chloride substantially in stoichiometric proportion; about 27% metallic palladium, and 73% silver chloride. The metallic palladium is a desirable constituent of the deposit because of its hydrogen absorbing propensity. The amount of silver chloride in this deposit is substantially in excess of that immediately soluble in the electrolyte in a finished capacitor. Thus, silver chloride is present to dissolve in the electrolyte as that already in solution is used up by electrolysis.

Many modifications and variations of the present invention are possible in the light of the above teachings. It is, therefore, to be understood that within the scope of the appended claims, the invention may be practiced otherwise than as specifically described.

I claim:
1. A method of producing a capacitor having an oxide coated anode, a silver cathode, and a lithium chloride electrolyte, said method comprising providing silver chloride in excess of the quantity necessary to produce a saturated solution in said electrolyte by soaking an absorbent spacer in silver nitrate and inserting said spacer in said electrolyte between said anode and said cathode.

2. An electrolytic capacitor comprising an oxide-coated pellet-type valve-metal anode, a silver cathode, an electrolyte solution of lithium chloride and silver chloride contacting said anode and said cathode, the silver chloride being present in said electrolyte solution in excess of saturation, and an absorbent spacer in said electrolyte between said anode and said cathode, the pores of said spacer being loaded with silver chloride, thereby providing said electrolyte with a reservoir of silver ions.

References Cited by the Examiner
UNITED STATES PATENTS

| | | | |
|---|---|---|---|
| 2,778,979 | 1/1957 | Booe | 317—230 |
| 2,871,423 | 1/1959 | Aikman | 317—230 |
| 2,871,424 | 1/1959 | Aikman | 317—230 |
| 2,900,579 | 8/1959 | Rogers | 317—230 |

GEORGE N. WESTBY, *Primary Examiner.*
JOHN W. HUCKERT, *Examiner.*
J. D. KALLAM, *Assistant Examiner.*